W. FAGAN.
ANIMAL TRAP.
APPLICATION FILED JUNE 22, 1907.
899,722.
Patented Sept. 29, 1908.
2 SHEETS—SHEET 2.
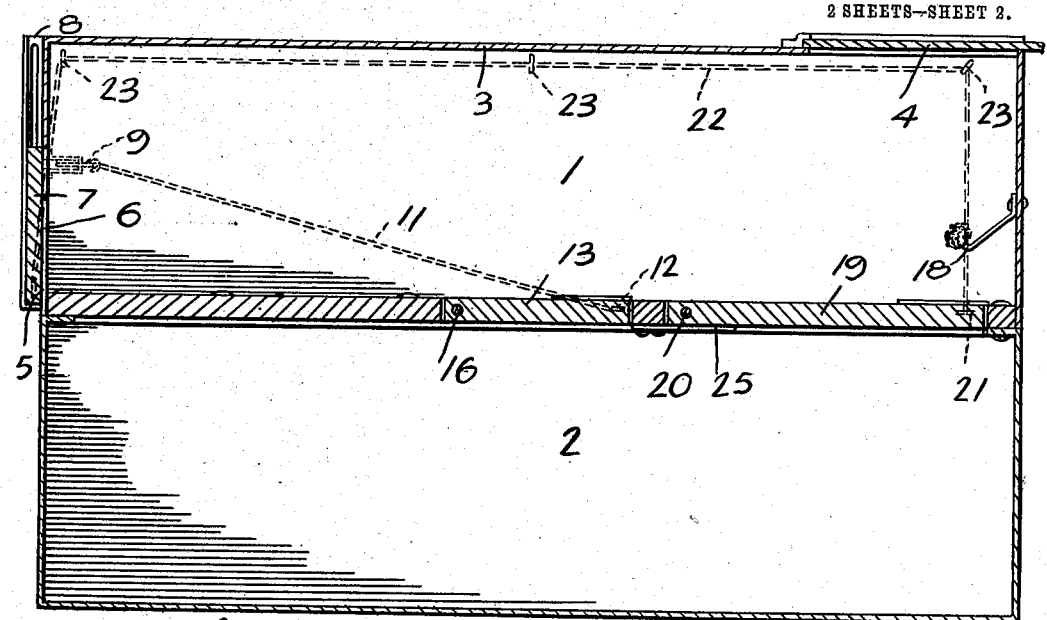
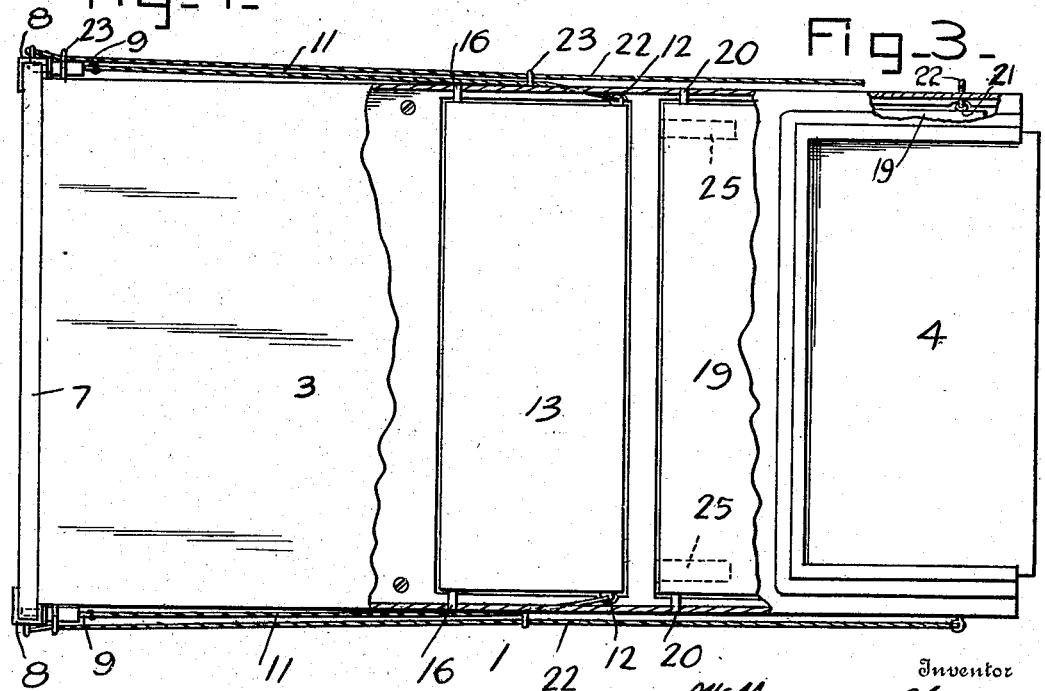
Witnesses
W. Rockwell
E. S. J. Oertel
Inventor
William Fagan
By Chandlee & Chandlee
Attorneys

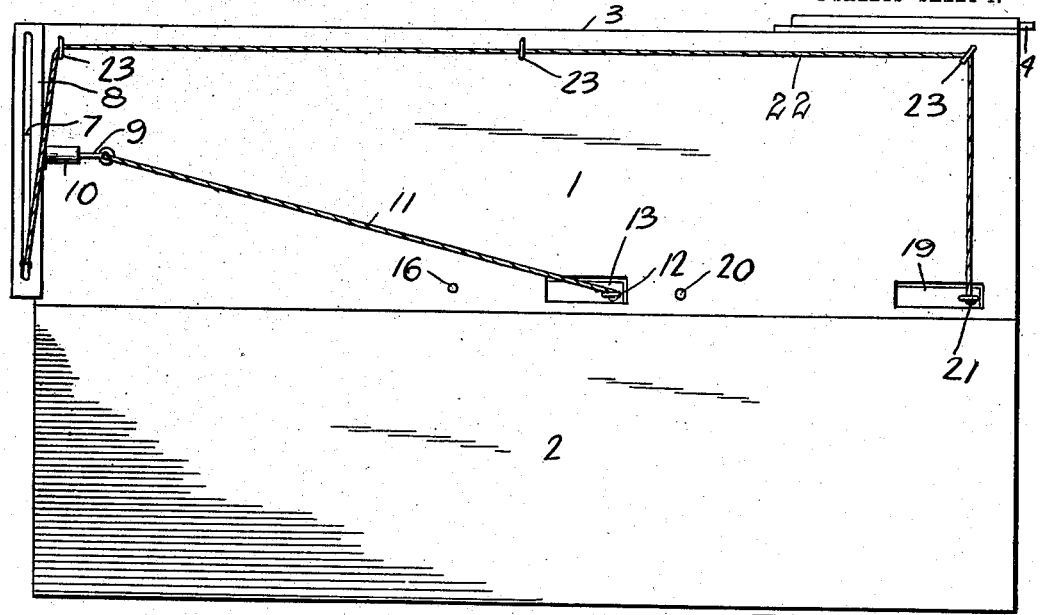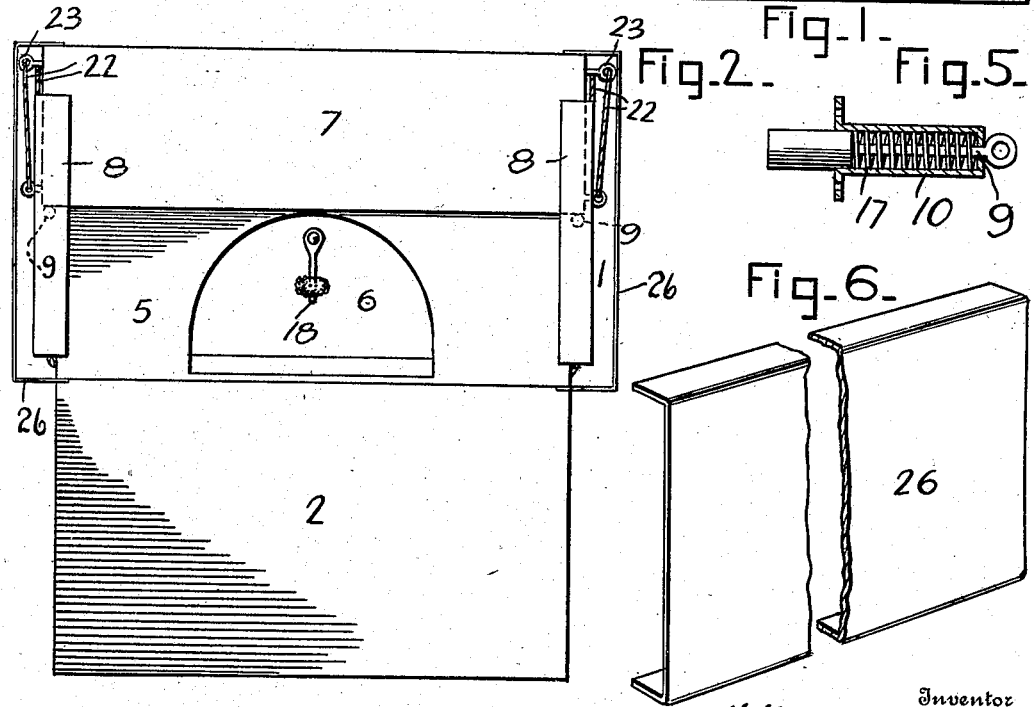

UNITED STATES PATENT OFFICE.

WILLIAM FAGAN, OF ENGLEWOOD, SOUTH DAKOTA.

ANIMAL-TRAP.

No. 899,722.　　　Specification of Letters Patent.　　　Patented Sept. 29, 1908.

Application filed June 22, 1907. Serial No. 380,287.

*To all whom it may concern:*

Be it known that I, WILLIAM FAGAN, a citizen of the United States, residing at Englewood, in the county of Lawrence, State of South Dakota, have invented certain new and useful Improvements in Animal-Traps; and I do hereby declare the following to be a full, clear, and exact description of the invention, such as will enable others skilled in the art to which it appertains to make and use the same.

The present invention has reference to animal-traps, and it aims to provide an exceedingly simple, inexpensive, and effective, self-setting device of that nature.

To this end the invention resides in the provision of a pair of oscillating platforms, formed in the bottom plate of the receptacle and disposed one in advance of the other, the forward platform having a flexible connection with the spring-pressed bolt which holds the door of the trap in raised position, while the rear platform is connected with the door itself and is located directly above an opening formed in the top of a receptacle upon which the trap is mounted, whereby the weight of an animal within the trap upon the rear platform will cause the latter to tilt downwardly and eject the animal into the receptacle, and at the same time will raise the door, which has been lowered by the tilting of the first platform, into position for engagement with the spring bolt.

The invention will be readily understood from a consideration of the following detailed description, and its preferred embodiment is illustrated in the accompanying drawings in which like parts are designated by corresponding reference numerals in the several views.

Of the said drawings, Figure 1 is a side elevation of a trap constructed in accordance with the present invention, Fig. 2 is a front view thereof, Fig. 3 is a fragmental plan view, Fig. 4 is a longitudinal vertical section, Fig. 5 is an enlarged view partly in section through the casing of one of the spring bolts, and, Fig. 6 is a perspective view of one of the shields with which the sides of the trap may be provided.

Referring more particularly to the drawings, the numeral 1 designates the trap which is mounted upon a receptacle 2 and held in place thereon by screws or other preferred means the top 3 of the trap being provided with a sliding door 4 while its front wall 5 has an opening 6 formed therein, which serves as an entrance to the interior of the trap. This opening 6 is closed, when the trap is sprung, by a door 7 which is slidable vertically across the front wall of the trap and is held against displacement by guides 8, disposed adjacent the opposite side edges of the door.

The door 7 is held in raised position, when the trap is set, by means of spring-pressed bolts 9 which are slidable in casings 10 secured to the sides of the trap adjacent the forward edges thereof, each bolt having an eye formed on its rear end to which one end of a cord or other flexible element 11 is fastened, the opposite end of the cord being fastened to a laterally-projecting pin 12 formed on the adjacent side edges of an oscillating platform 13 which forms, in fact, a section of the floor of the trap, the lower edge of the trap sides being cut away to permit the cords 11 to be secured to the pins 12 the cords being disposed against the outer faces of the trap sides, as shown. The platform 13 is disposed transversely of the trap and has its pivot pins 16 located towards its forward edge.

Owing to the provision of the expansible coil-springs 17 which are located in the casings 10 and normally force the bolts 9 outwards, it will be apparent that when the entrance door 7 is raised, the forward ends of said bolts will be projected beneath the lower edge of the door and will retain the latter in such position. It will be equally apparent, moreover, that when an animal enters the trap, attracted by the bait which is placed upon the bait-hook 18 secured to the rear wall of the trap, and treads upon the platform, the latter will tilt downwardly upon its pivots thus retracting the bolts, whereupon the door will at once fall of its own weight, trapping the animal. The tilting movement of the platform is very slight, as merely the ends of the bolts project beneath the door.

Disposed slightly in the rear of the platform 13 is a second platform 19, which is likewise arranged transversely of the trap and rocks or tilts upon its pivot pins 20 which are located towards its forward edge, as shown. This platform is also provided with a second pair of pins 21 which project laterally from the rear ends of its side edges and have connected thereto the rear ends of a second pair of cords 22 which are likewise disposed externally of the trap, and are held in position by a series of eyes or staples 23 which are set into the corresponding sides of the trap. The forward ends of the cords 22 are connected to the side edges of the door 7, towards the lower end thereof.

By reason of this construction it will be apparent that the weight of the trapped animal upon the rear platform will cause the latter to swing downwardly upon its pivots, thus dropping the animal through the open top of the receptacle 2 into the interior of the latter. This downward rocking of the platform 19 will cause the door 7 to move upwardly until the bolts are free to shoot beneath the lower edge of the door, thus holding the latter in its raised position and resetting the trap. The platform is returned to its normal position, after the animal has been dumped into the receptacle 2, by means of the springs 25. It will therefore be apparent that the trap is sprung by the movement of the front platform, and re-set by that of the rear platform, actuation of both platforms being effected by the animal itself within the trap.

In order to protect the cords which are connected to the door and to the platforms, and to prevent unwarranted interference therewith, with a resultant movement of the door in one direction or the other, each side of the trap may be provided with a metal shield 26 by which it is incased, the edges of each shield being bent so as to rest against the top and bottom of the trap, while its body is offset from the trap sides, so as not to interfere with the movement of the cords, when the platforms are actuated by the trapped animal.

It is to be understood that the cords on either side of the trap may be dispensed with, the platforms being actuated by the remaining set of cords.

What is claimed, is,

1. The combination, in an animal trap having an entrance opening formed in its front wall, of a pair of transversely-disposed tiltable platforms located in the bottom wall of the trap, and arranged one in advance of the other; a door disposed against the front wall of the trap and movable vertically to cover and uncover the opening therein; spring-actuated supporting means secured to the outer face of one of the sides of the trap and adapted to project beneath the lower edge of the door, when the latter is raised, to hold it in such position; a flexible member disposed against said side face and connected at one end to the forward platform and at the other end to said supporting means, to retract the latter when said forward platform is tilted, to permit said door to fall; a second flexible member disposed against said side face of the trap, and connected at one end to the door and at the other end to the adjacent side edge of the rear platform, to raise the door, when said platform is tilted, into position to permit engagement of said supporting means therewith; and a shield secured to the trap at its upper and lower edges and having its body-portion spaced away from the side face of the trap against which said flexible members are disposed, to prevent interference therewith.

2. The combination, in an animal trap having an entrance opening formed in its front wall, of a pair of transversely-disposed tiltable platforms located in the bottom wall of the trap and arranged one in advance of the other, each platform having a laterally-projecting pin on each of its side edges; a bolt casing secured to each of the outer side faces of the trap at the forward end thereof; a spring-pressed bolt located in each casing and adapted to project beneath the lower edge of the door, when the latter is raised, to hold it in such position; a flexible element connected at one end with each pin of the forward platform, and at the other end with the adjacent bolt, to retract the latter when said platform is operated, to permit the door to fall; and a second flexible element connected at one end to each pin of the rear platform and at the other end to the adjacent side edges of the door, to raise the latter, when the last-mentioned platform is tilted, to permit the engagement of said bolts therewith.

In testimony whereof, I affix my signature, in presence of two witnesses.

WILLIAM FAGAN.

Witnesses:
M. R. RUSSELL,
LEE R. BAXTER.